(12) United States Patent
Chang

(10) Patent No.: US 9,209,850 B2
(45) Date of Patent: Dec. 8, 2015

(54) PROTECTIVE CASE FOR CONTROLLING SOUND WAVES

(71) Applicant: David Chang, Houston, TX (US)

(72) Inventor: David Chang, Houston, TX (US)

( * ) Notice: Subject to any disclaimer, the term of this patent is extended or adjusted under 35 U.S.C. 154(b) by 72 days.

(21) Appl. No.: 14/084,574

(22) Filed: Nov. 19, 2013

(65) Prior Publication Data

US 2014/0228081 A1  Aug. 14, 2014

Related U.S. Application Data

(60) Provisional application No. 61/762,372, filed on Feb. 8, 2013.

(51) Int. Cl.
| H04M 1/00 | (2006.01) |
|---|---|
| H04B 1/3888 | (2015.01) |
| G10K 11/00 | (2006.01) |
| H04M 1/18 | (2006.01) |
| H04B 1/3816 | (2015.01) |
| H04M 1/03 | (2006.01) |

(52) U.S. Cl.
CPC ............ *H04B 1/3888* (2013.01); *G10K 11/002* (2013.01); *H04M 1/185* (2013.01); *H04B 1/3816* (2013.01); *H04M 1/035* (2013.01)

(58) Field of Classification Search
CPC ......... H04M 1/035; H04M 1/03; H04M 1/20; H04M 1/2155
USPC ............ 455/556.1, 550.1, 575.1, 575.8, 90.3; 381/351, 352, 356
See application file for complete search history.

(56) References Cited

U.S. PATENT DOCUMENTS

| 5,909,490 | A * | 6/1999 | Sokolich et al. ......... 379/433.02 |
|---|---|---|---|
| 7,474,747 | B2 * | 1/2009 | Esquivia-Lee et al. .. 379/433.02 |
| 8,971,974 | B2 * | 3/2015 | Weaver, III ................. 455/575.8 |
| 2002/0052216 | A1 * | 5/2002 | Song .............................. 455/550 |
| 2011/0226545 | A1 * | 9/2011 | Richardson et al. .......... 181/200 |
| 2012/0027237 | A1 * | 2/2012 | Lin ............................... 381/340 |
| 2012/0294469 | A1 * | 11/2012 | Weaver, III .................... 381/334 |
| 2014/0141846 | A1 * | 5/2014 | Weaver, III ................. 455/575.1 |

* cited by examiner

*Primary Examiner* — Sonny Trinh
(74) *Attorney, Agent, or Firm* — Buche & Associates, P.C.; John K. Buche; Scott D. Compton

(57) ABSTRACT

The present application is directed to a protective case for an electronic device including a first member and a second member operationally configured to house an electronic device therein; wherein the first member is operationally configured to direct sound waves to an inner surface of the second member; and wherein the second member is operationally configured to dictate travel of sound waves within the protective case.

3 Claims, 6 Drawing Sheets

PROTECTIVE CASE FOR CONTROLLING SOUND WAVES

CROSS-REFERENCE TO RELATED APPLICATIONS

This application claims the benefit of provisional patent application No. 61/762,372 filed on Feb. 8, 2013.

STATEMENT REGARDING FEDERALLY SPONSORED RESEARCH OR DEVELOPMENT

Not applicable.

FIELD OF THE APPLICATION

The application relates generally to controlling sound waves in protective cases designed to house sound forming and/or sound receiving electronic devices therein.

BACKGROUND

Protective cases for electronic devices, including for example, waterproof cases for smart phones or tablets are typically designed to prevent fluids from entering the case. However, such cases also trap sound waves emitted from the electronic devices inside the case. For example, sound waves emitted from a smart phone inside a protective case bounce of the internal surfaces of the protective case diminishing the operability of the noise cancellation features of the microphone(s) of the smart phone and cause echo issues when a user is talking into the microphone(s).

Overcoming the above shortcomings is desired.

SUMMARY

The present application is directed to a protective case for an electronic device including a first member and a second member operationally configured to house an electronic device therein; wherein the first member is operationally configured to direct sound waves to an inner surface of the second member; and wherein the second member is operationally configured to dictate travel of sound waves within the protective case.

The present application is also directed to a system for controlling sound waves within a protective case for a smart phone, including (1) a smart phone and (2) a protective case having a first member and a second member operationally configured to house the smart phone therein; wherein the first member includes a sound barrier operationally configured to direct sound waves to a first end of the smart phone and to an inner surface of the second member; and wherein the second member includes a sound barrier operationally configured to prevent sound waves from reaching the second end of the smart phone.

The present application is also directed to a method of controlling sound waves within a protective case for an electronic device, including providing a providing case having a first member and a second member operationally configured to house an electronic device therein; wherein the first member is operationally configured to direct sound waves originating outside of the protective case to an inner surface of the second member; and wherein the second member is operationally configured to dictate travel of sound waves within the protective case.

BRIEF DESCRIPTION

Figure 1:
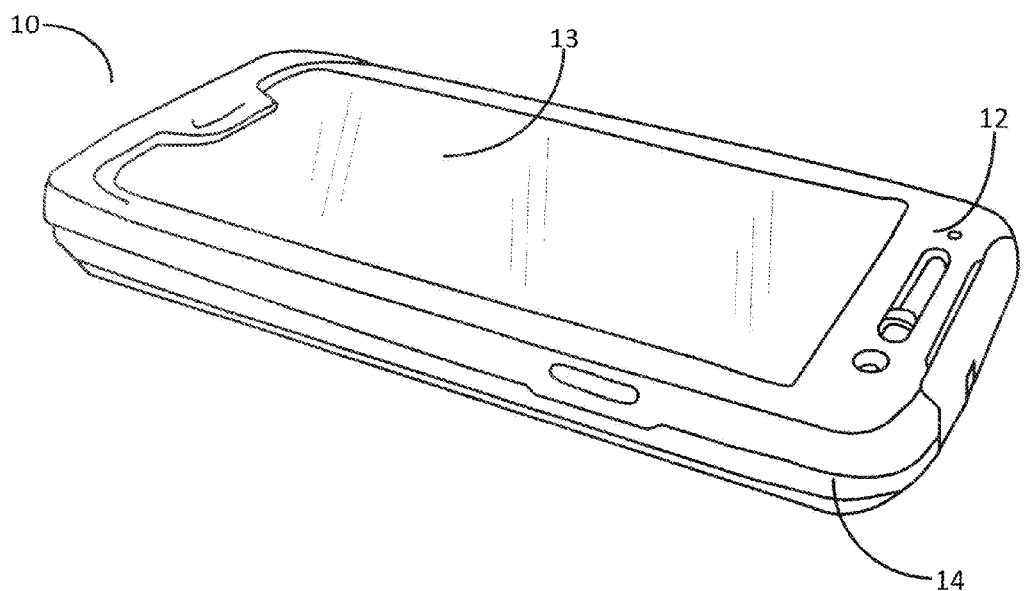
FIG. 1 is a perspective view of a protective case of this application.

It has been discovered that a protective case may be provided that is operationally configured to tunnel, direct or otherwise control sound waves in a manner effective to maximize microphone operability of the electronic device housed within the protective case. Heretofore, such a desirable achievement has not been considered possible, and accordingly, the system and method of this application measure up to the dignity of patentability and therefore represents a patentable concept.

Before describing the invention in detail, it is to be understood that the present case and method are not limited to particular embodiments. It is also to be understood that the terminology used herein is for the purpose of describing particular embodiments only, and is not intended to be limiting. As used in this specification and the appended claims, the phrase "electronic device" may include portable electronic devices including, but not necessarily limited to mobile phones, multimedia players, personal digital assistants, handheld game consoles, handheld satellite navigation systems, notebook computers, calculators, and combinations thereof. As understood by the skilled artisan, sound or (a "sound wave") may be referred to herein simply as mechanical energy made by vibrations that can travel through gases, liquids and solids.

In one aspect, the application provides a protective case operationally configured to direct sound waves in a manner effective to diminish echo effects related to use of an electronic device housed therein and prevent sound waves from reaching noise cancellation microphone(s) of the electronic device.

In another aspect, the application provides a method of preventing reflected sound waves from arriving at a microphone of an electronic device housed within a protective case after the direct sound waves have reached the microphone.

In another aspect, the application provides a protective case for devices such as cellular phones, including smart phones, operationally configured to prevent voice call echo issues when a user is operating the device as a telephone via an oral conversation with another.

In another aspect, the application provides a protective case for devices such as cellular phones, including smart phones, operationally configured to prevent sound waves from reaching noise cancellation microphone(s) of the device.

In another aspect, the application provides a protective case for electronic devices including a top portion and a bottom portion. The top portion is operationally configured to direct or tunnel sound waves to the bottom portion.

In another aspect, the application provides a protective case for an electronic communication device operationally configured to isolate various types of noise and echoes while preserving intelligible and natural sounding speech of a user talking into the device.

In another aspect, the application provides a protective case for an electronic communication device operationally configured to diminish background noise.

In another aspect, the application provides a protective case for electronic devices including a top portion and a bottom portion. The bottom portion is operationally configured to prevent sound waves from reaching a plurality of inner surfaces of the protective case during operation.

In another aspect, the application provides a protective case for electronic devices including one or more inner surfaces provided with one or more sound absorbing materials operationally configured to control sound wave travel within the protective case.

In another aspect, the application provides a protective case for electronic devices including one or more inner surfaces provided with one or more sound blocking materials operationally configured to control sound wave travel within the protective case.

In another aspect, the application provides a protective case for electronic devices including one or more inner surfaces provided with one or more noise control materials operationally configured to control sound wave travel within the protective case.

In another aspect, the application provides a protective case for electronic devices including a top portion and a bottom portion. The top portion is operationally configured to direct or tunnel sound waves to an inner surface of the protective case including a sound barrier operationally configured to limit the travel distance of sound waves therein.

DISCUSSION

With reference to FIG. 1, a suitable protective case 10 includes a first member 12 and a second member 14 operationally configured to house an electronic device therein when the first and second members 12, 14 are mated together. Although the present protective case 10 may be used with any electronic device or portable electronic device as desired, for simplicity, the application will be discussed in terms of a protective case 10 operationally configured to house a smart phone—as the term is understood by the skilled artisan in cellular communication technology. For the purposes of this application, a suitable protective case 10 may be constructed from rigid and/or semi-rigid materials. Without limiting the invention, suitable materials of construction may include, but are not necessarily limited to metals, woods, plastics, rubbers, ceramics, filled composite materials, carbon fiber, and combinations thereof. Suitable plastics may include, but are not necessarily limited to thermoset plastics and thermoplastics such as polyurethane, polypropylene, polyethylene and copolymers thereof and engineering thermoplastics such as acrylonitrile butadiene styrene (ABS), polycarbonate, polyamides (e.g. Nylon), polysulphone, polybutylene terephthalate (PBT), polyethylene terephthalate (PET). Plastics may also include composite materials, for example, plastics containing inorganic or organic fillers and/or high aspect ratio reinforcements, e.g., fiberglass, carbon fibers, graphite fibers. Plastics may also be cross-linked by conventional means to control stiffness of the final part. As stated above, thermosets can also be used such as epoxy resins, phenolic resins including composites of these resins with fillers and reinforcements as desired. In one particular embodiment, the protective case 10 may be constructed from thermoplastic polyurethane. Suitable metals may include, but are not necessarily limited to metal alloys such as aluminum, titanium, copper, brass, nickel alloy, stainless steel, carbon steel, and combinations thereof.

Figure 2:
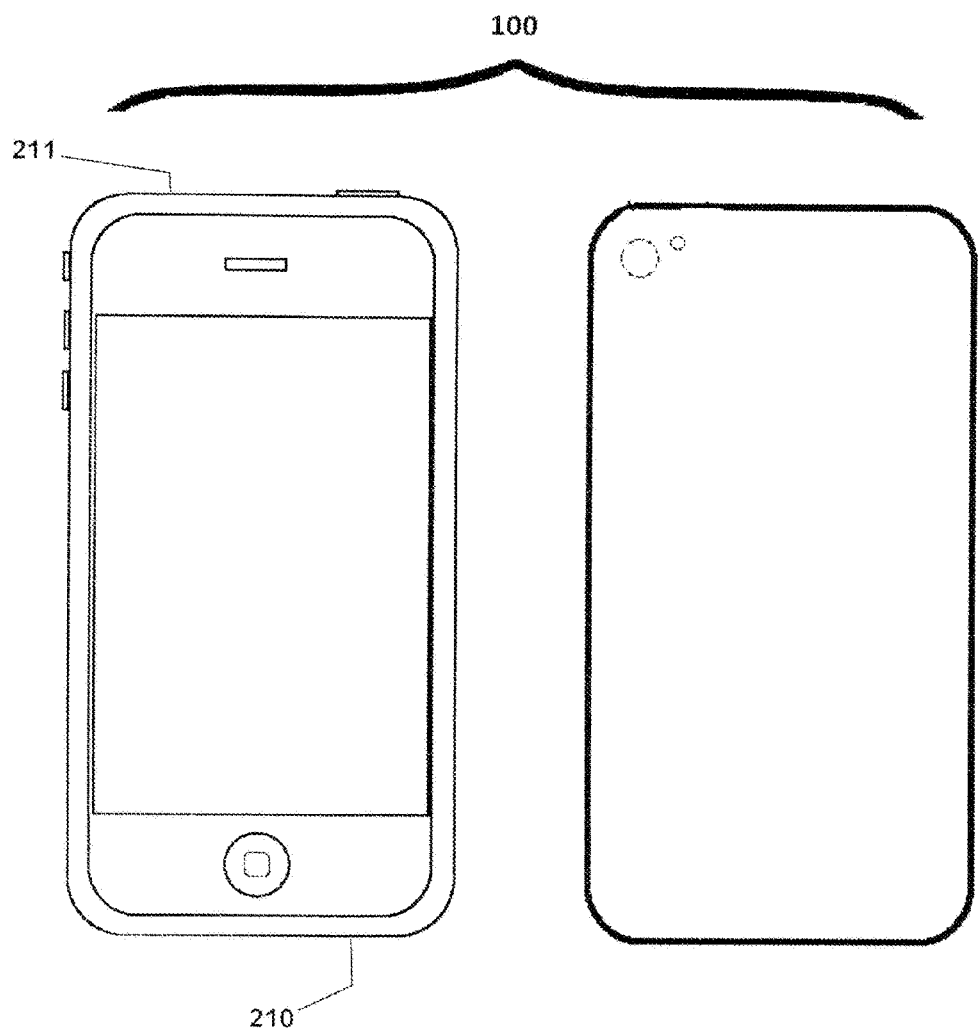
FIG. 2 is a simplified illustration of a commercially available smart phone that may be housed within the protective case of this application.

As understood by the skilled artisan, smart phones typically include user interfaces and various interactive features, including microphones and speakers enabling the smart phone to be utilized as just that—a phone (or telephone). For exemplary purposes only, one smart phone that is commercially available for use with a present protective case 10 of this application is depicted in FIG. 2, which represents an Apple® iPhone commercially available from Apple Inc. Cupertino, Calif. U.S.A. Another commercially available smart phone that may be used with a protective case 10 of this application includes the Samsung® Galaxy S4 offered by Samsung Electronics, Ridgefield Park, N.J. U.S.A. As understood by the skilled artisan, the protective case 10 may be configured to correspond to various input/output features of a particular smart phone. As shown in FIG. 2, smart phones 100 produced at the time of the filing of this application typically include multiple microphones such as a bottom microphone 210 and a noise cancellation microphone 211 located on the opposite end of the smart phone as shown. With known protective cases, sounds originating for example, from a person's voice and directed to the bottom microphone travel within the protective case and reflect off the inner surfaces of the protective case causing an echo effect, softening the sound and trapping the sound within the protective case whereby sound waves may interfere with desired operation of the noise cancellation microphone, which is employed to assist in removing unwanted ambient noises such as background noise. The protective case 10 of this application is advantageous in that it helps trap or otherwise dictate the travel area of sound waves received within the protective case 10 minimizing one or more of the negatives effects described above.

Figure 3:
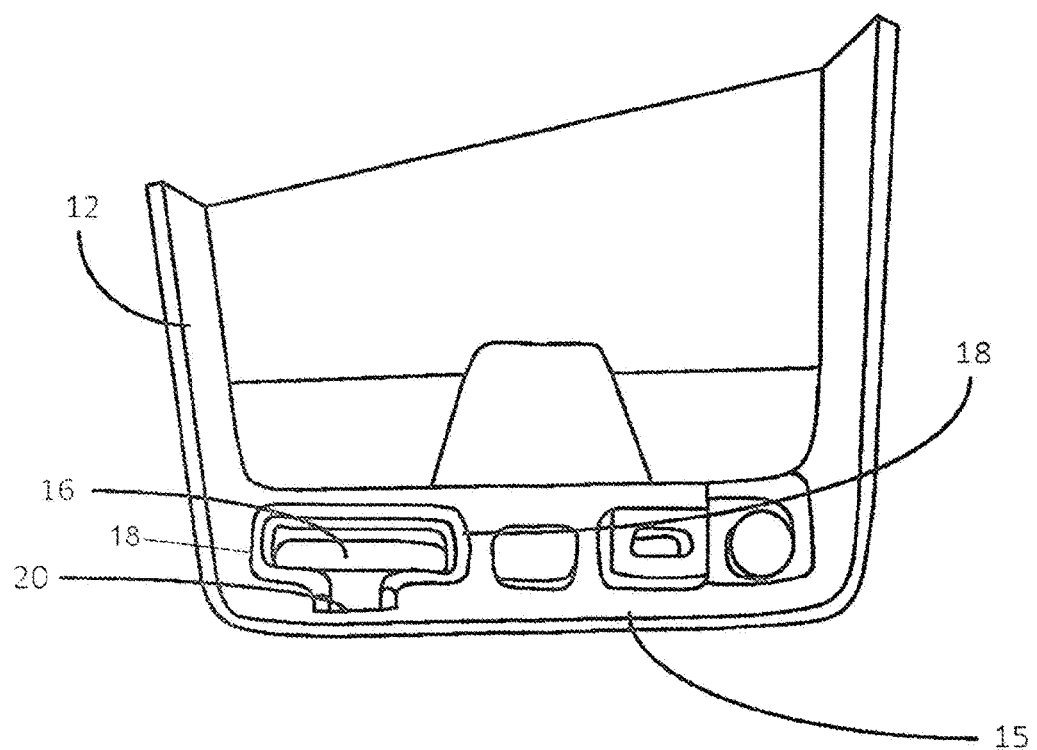
FIG. 3 is a view of part of the inner surface of a first member of a protective case.

Turning to FIG. 3, the first member 12 suitably includes an acoustical vent or sound transmission vent 16 (or microphone acoustic vent) in acoustical communication with the bottom microphone 210 of a smart phone housed within the protective case 10. Suitably, the sound transmission vent 16 is constructed from one or more acoustically transparent waterproof materials. Exemplary acoustically transparent waterproof materials may include waterproof/breathable fabrics. Suitable acoustically transparent waterproof materials include but are not necessarily limited to polyethylene terephthalate ("PET"), waterproof/breathable fabrics, polymeric membrane material, and combinations thereof. The acoustically transparent waterproof materials may also include outer coatings as desired including, but not necessarily limited to polytetrafluoroethylene ("PTFE"). A suitable waterproof/breathable fabric is commercially available from W. L. Gore & Associates under the brand name GORE-TEX®. A suitable PTFE is commercially available from E. I. du Pont de Nemours and Company, commonly referred to as DuPont under the brand name TEFLON®. As FIG. 3 further illustrates, the sound transmission vent 16 is surrounded by a first seal member 18 disposed along the perimeter of the sound transmission vent and forming a tunnel opening 20 operationally configured to direct sound waves toward the second member 14. Suitably, the first seal member 18 rises from the inner surface 15 of the first member 12 a distance effective to abut against an electronic device housed within the protective case 10, thereby forming a substantially sealable acoustic pathway.

Without limiting the invention, the first seal member 18 is suitably constructed from one or more materials operationally configured to direct sound waves as desired. Suitable first seal member 18 materials may include, but are not necessarily limited to polymer materials, cork, leather, textiles, and combinations thereof. Suitably polymer materials may include, but are not necessarily limited to rubbers, plastics, foam, and combinations thereof. In one particular embodiment, the first seal member 18 may be constructed from silicon rubber. In another particular embodiment, the first seal member 18 may be constructed from foam. In another particular embodiment, the first seal member 18 may be constructed from plastic. Depending on the materials of construction employed, a first seal member 18 may be permanently or releasably attached to the first member 12 as desired. For example, in an embodiment including a first seal member 18 constructed from silicon rubber, the first seal member 18 may be adhered to the first member 12 via one or more adhesives and the like. In another embodiment, the first seal member 18 may be mechanically attached to the first member 12.

Figure 4:
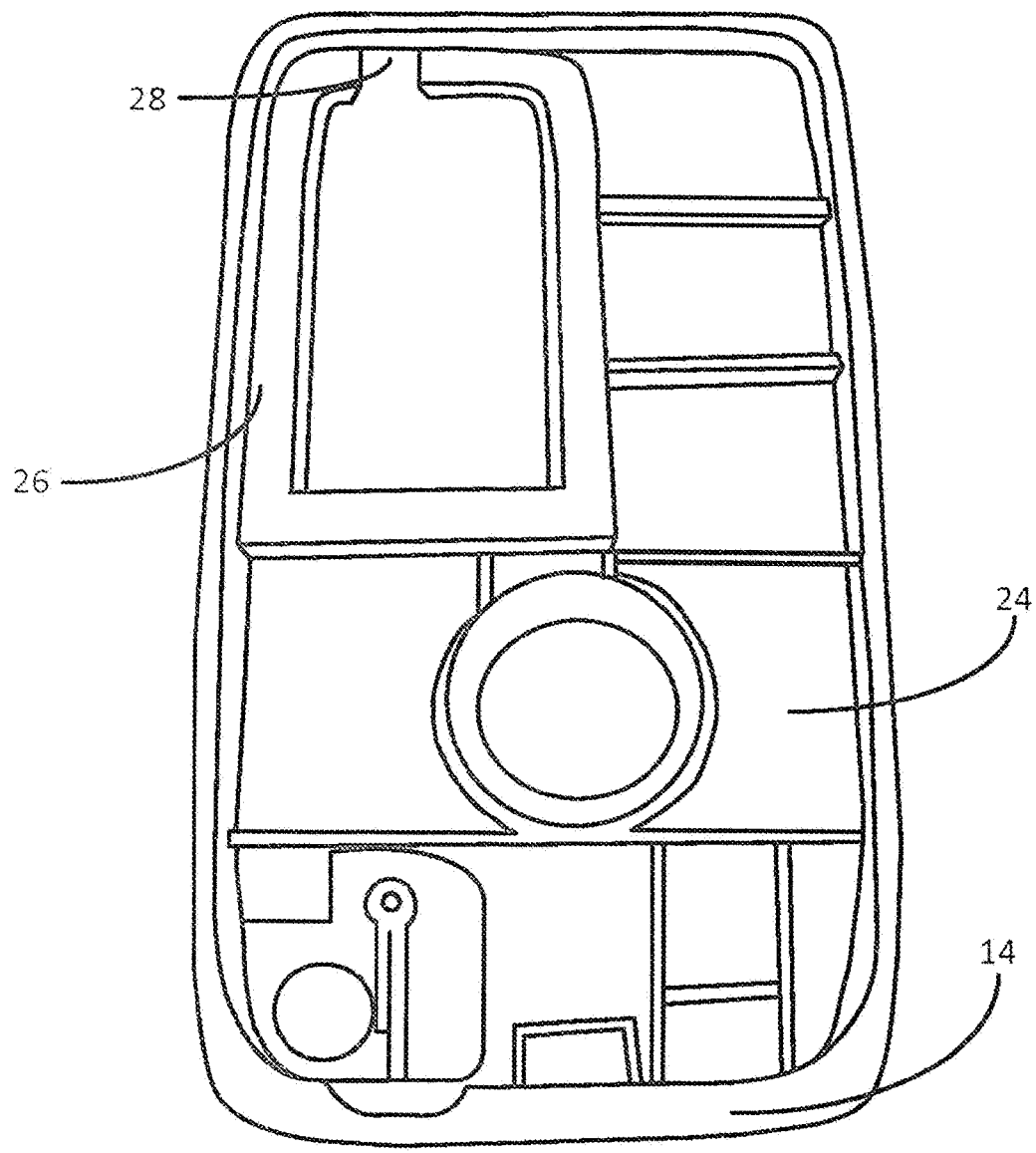
FIG. 4 is a perspective view of the inner surface of a second member of a protective case.

With attention to FIG. 4, the inner surface 24 of the second member 14 includes a second seal member 26 in acoustical communication with the first seal member 18. As shown, the second seal member 26 is disposed along the inner surface 24 in a manner effective to form an acoustical barrier and dictate the travel distance of sound waves within the protective case 10 along a predetermined portion of the inner surface 24. In particular, the second seal member 26 is operationally configured to receive the back surface of an electronic device in abutment thereto whereby an acoustic barrier is formed between the second seal member 26 and electronic device housed with the protective case 10.

Without limiting the invention, the second seal member 26 may be constructed from one or more materials operationally configured to further provide shock absorbing and/or vibration dampening qualities to the protective case 10 and electronic device housed therein. Suitable second seal member 26 materials may include, but are not necessarily limited to polymer materials, cork, leather, textiles, and combinations thereof. Suitably polymer materials may include, but are not necessarily limited to rubbers, plastics, foam, and combinations thereof. In one particular embodiment, the second seal member 26 may be constructed from silicon rubber. In another particular embodiment, the second seal member 26 may be constructed from foam or foam padding. In another particular embodiment, the second seal member 26 may be constructed from plastic. Depending on the materials of construction employed, a second seal member 26 may be permanently or releasably attached to the second member 14 as desired. For example, in an embodiment including a second seal member 26 constructed from foam padding, the second seal member 26 may be adhered to the second member 14 via one or more adhesives and the like. In another embodiment, the second seal member 26 may be mechanically attached to the second member 14.

Figure 5:
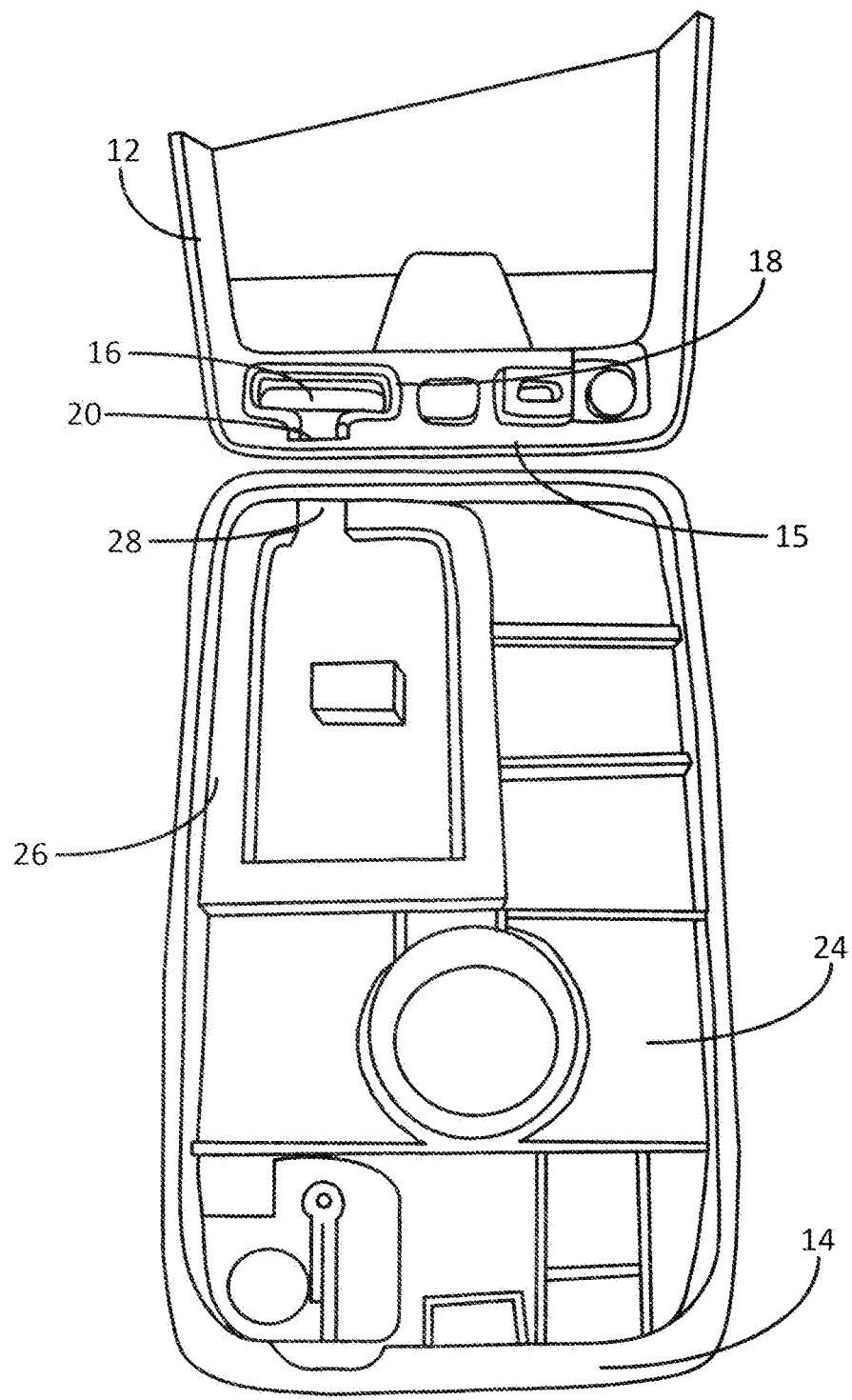
FIG. 5 is a perspective view illustrating corresponding inner surfaces of the first and second members of a protective case.
Figure 6:
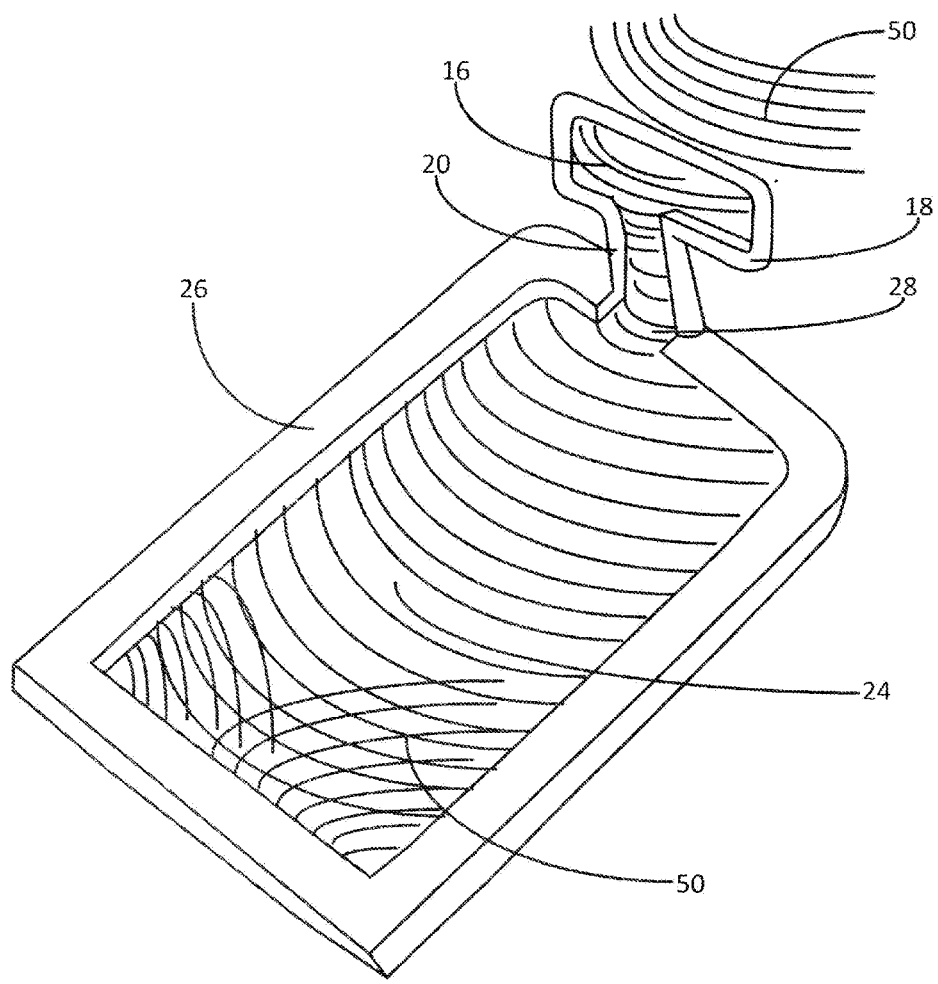
FIG. 6 is a simplified illustration including sound wave travel during operation of the protective case.

In operation, the second seal member 26 includes a mouth 28 that is in substantial alignment with the tunnel opening 20 during operation of the protective case—see FIG. 5. As shown in the simplified illustration of FIG. 6, as sound waves 50 enter through the sound transmission vent 16 the sound waves reflect or bounce off of the first seal member 18 and are directed to the mouth 28 of the second seal member 26 where after the second seal member 26 blocks travel of the sound waves beyond the inner border surface of the second seal member 26—the sound waves reflecting off the inner border surface of the second seal member 26. As understood by the skilled artisan, depending on the materials of construction, some sound waves may be absorbed by one or more of the sound transmission vent 16, the first seal member 18, the inner surface 24 of the second member 14, the second seal member 26 and the electronic device 100 housed within the protective case 10.

Persons of ordinary skill in the art will recognize that many modifications may be made to the present application without departing from the spirit and scope of the application. The embodiment(s) described herein are meant to be illustrative only and should not be taken as limiting the invention, which is defined in the claims.

I claim:

1. A system for controlling sound waves within a protective case for a smart phone, including:
    a smart phone; and
    a protective case having a first member and a second member operationally configured to house the smart phone therein;
    wherein the first member includes a sound barrier operationally configured to direct sound waves to a first end of the smart phone and to an inner surface of the second member; and
    wherein the second member includes a sound barrier operationally configured to prevent sound waves from reaching the second end of the smart phone.

2. The system of claim 1 wherein the sound barrier is effective to abut the first end of the smart phone.

3. The system of claim 1 wherein the sound barrier of the second member is operationally configured to receive a back surface of the smart phone in abutment thereto.

* * * * *